United States Patent [19]
Caillat et al.

[11] Patent Number: 5,407,335
[45] Date of Patent: Apr. 18, 1995

[54] NON-ORBITING SCROLL MOUNTING ARRANGEMENTS FOR A SCROLL MACHINE

[75] Inventors: Jean-Luc Caillat, Dayton; John P. Elson, Sidney; Gary J. Anderson, Sidney; Kenneth J. Monnier, Sidney; James F. Fogt, Sidney, all of Ohio

[73] Assignee: Copeland Corporation, Sidney, Ohio

[21] Appl. No.: 191,138

[22] Filed: Feb. 2, 1994

Related U.S. Application Data

[60] Continuation of Ser. No. 863,949, Apr. 6, 1992, abandoned, which is a continuation-in-part of Ser. No. 591,444, Oct. 1, 1990, Pat. No. 5,102,316, which is a continuation-in-part of Ser. No. 387,699, Jul. 31, 1989, Pat. No. 4,992,033, which is a division of Ser. No. 189,485, May 2, 1988, Pat. No. 4,877,382, which is a division of Ser. No. 899,003, Aug. 22, 1986, Pat. No. 4,767,293.

[51] Int. Cl.6 ............................................. F01C 1/04
[52] U.S. Cl. .................................. 418/55.1; 418/55.5; 418/151
[58] Field of Search .............. 418/55.1, 55.5, 57, 418/151; 29/888, 22

[56] References Cited

U.S. PATENT DOCUMENTS

| | | |
|---|---|---|
| 2,841,089 | 7/1958 | Jones . |
| 3,600,114 | 8/1971 | Dvorak et al. . |
| 3,874,827 | 4/1975 | Young .................. 418/55.5 |
| 3,884,599 | 5/1975 | Young et al. . |
| 4,065,279 | 12/1977 | McCullough . |
| 4,160,629 | 7/1979 | Hidden et al. . |
| 4,300,875 | 11/1981 | Fischer et al. ............ 418/57 |
| 4,304,535 | 12/1981 | Terauchi . |
| 4,314,796 | 2/1982 | Terauchi .................. 418/55.1 |
| 4,332,535 | 6/1982 | Terauchi et al. . |
| 4,395,205 | 7/1983 | McCullough . |
| 4,431,388 | 2/1984 | Eber et al. ................ 417/295 |
| 4,496,296 | 1/1985 | Arai et al. . |
| 4,609,334 | 9/1986 | Muir et al. ................ 418/55.5 |
| 4,655,697 | 4/1987 | Nakamura et al. . |
| 4,743,181 | 5/1988 | Murayama et al. .......... 418/55.5 |
| 4,767,293 | 8/1988 | Caillat et al. ............. 418/57 |
| 4,838,769 | 6/1989 | Gannaway .................. 417/312 |
| 4,840,545 | 6/1989 | Moilanen . |
| 4,865,531 | 9/1989 | Kakuda et al. ............. 418/55.1 |
| 4,911,620 | 3/1990 | Richardson, Jr. et al. ... 418/181 |
| 4,932,845 | 6/1990 | Kikuchi et al. ............ 418/55.5 |
| 5,088,906 | 2/1992 | Richardson, Jr. ........... 418/55.5 |

FOREIGN PATENT DOCUMENTS

| | | |
|---|---|---|
| 0012616 | 2/1984 | European Pat. Off. . |
| 55-72685 | 5/1980 | Japan . |
| 58-47101 | 3/1983 | Japan . |
| 58-172401 | 10/1983 | Japan .................. 418/55.5 |
| 58-192901 | 11/1983 | Japan . |
| 59-117895 | 8/1984 | Japan . |
| 59-142488 | 9/1984 | Japan . |
| 61-197785 | 9/1986 | Japan .................. 418/55.1 |
| 61-215479 | 9/1986 | Japan .................. 418/55.1 |
| 62-126288 | 6/1987 | Japan . |
| 62-150001 | 7/1987 | Japan . |
| 62-199986 | 9/1987 | Japan . |
| 1267382 | 10/1989 | Japan .................. 418/55.1 |
| 3-185287 | 8/1991 | Japan . |
| 3237283 | 10/1991 | Japan .................. 418/55.5 |
| 77206560 | 5/1986 | Taiwan, Prov. of China . |

*Primary Examiner*—John J. Vrablik
*Attorney, Agent, or Firm*—Harness, Dickey & Pierce

[57] ABSTRACT

A scroll type machine is disclosed which incorporates an improved mounting arrangement for the non-orbiting scroll member which mounting arrangement greatly facilitates manufacturing and assembly, effectively prevents radial displacement of the non-orbiting scroll member, and offers the advantages of axial compliance. In one embodiment, the non-orbiting scroll is axially movably secured to a bearing housing by means of a plurality of bolts or bolts and sleeves. In another embodiment a rigid annular ring serves to axially movably secure the non-orbiting scroll to the bearing housing while in a third embodiment a stamped ring is secured to both the non-orbiting scroll and the bearing housing. In another embodiment a two piece main bearing housing includes an integral ring for radially positioning the non-orbiting scroll member and means for securing anti-rotation and axial stop means thereto.

22 Claims, 11 Drawing Sheets

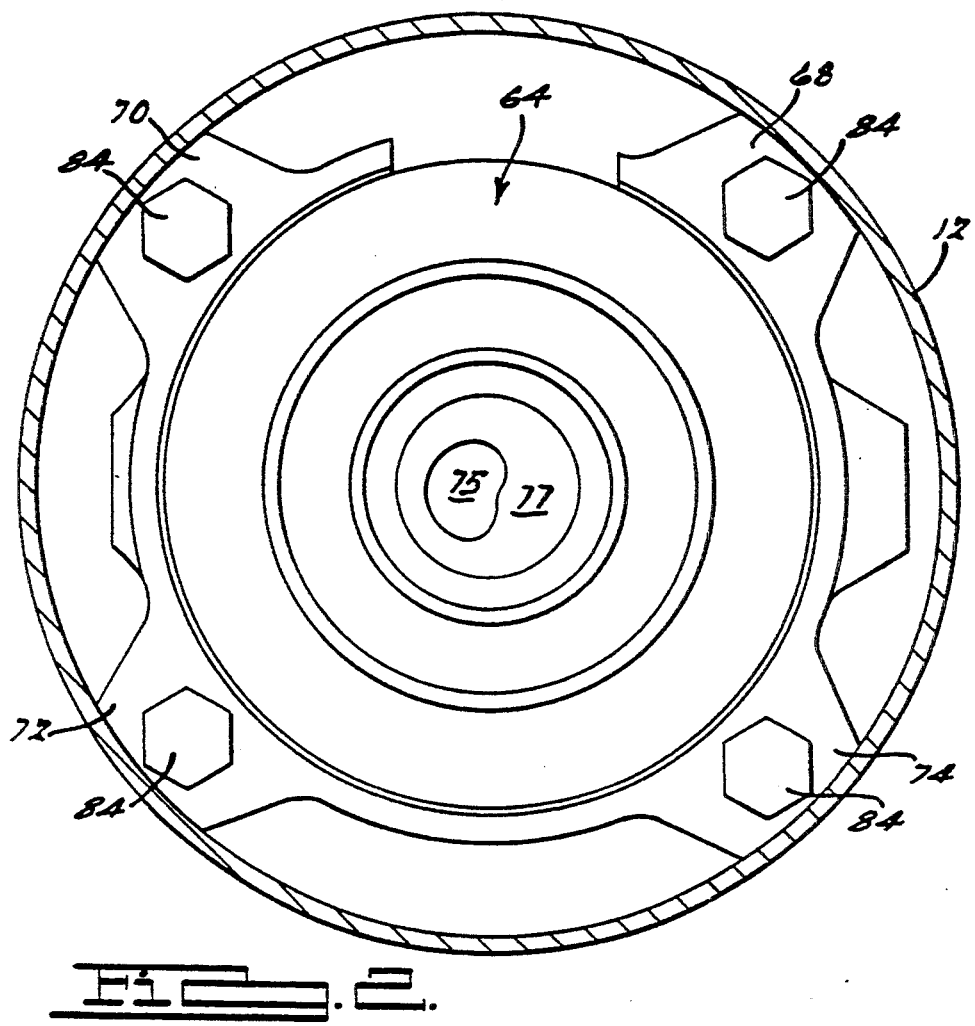
Fig. 2.
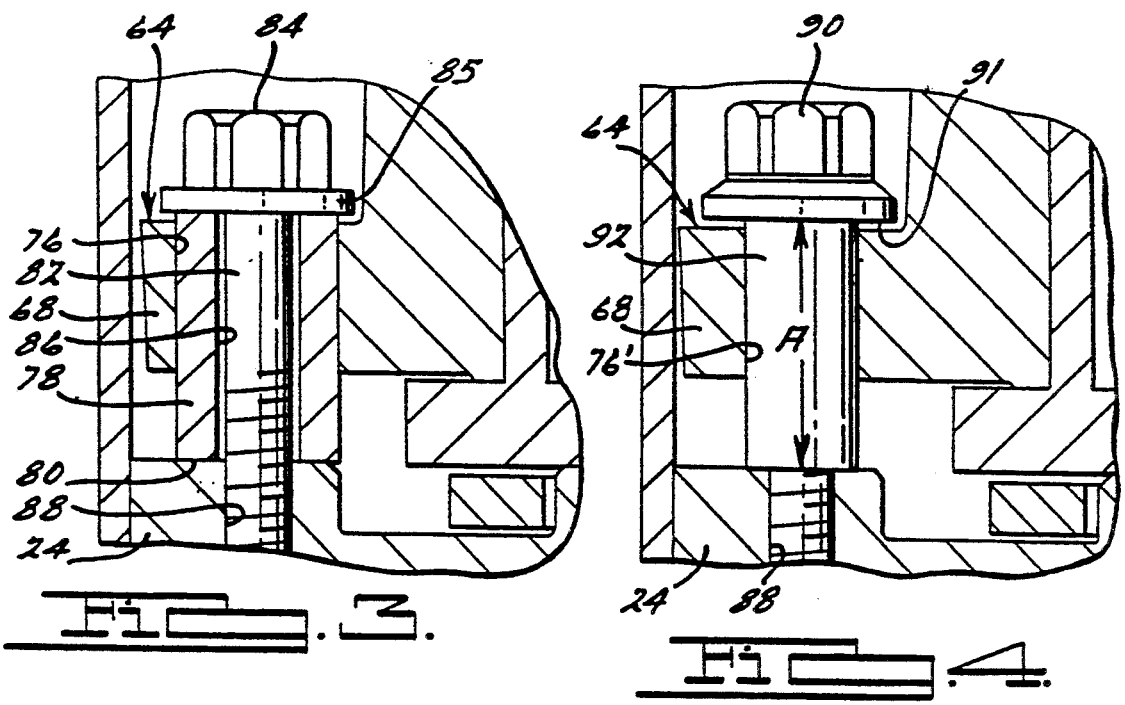
Fig. 3.
Fig. 4.

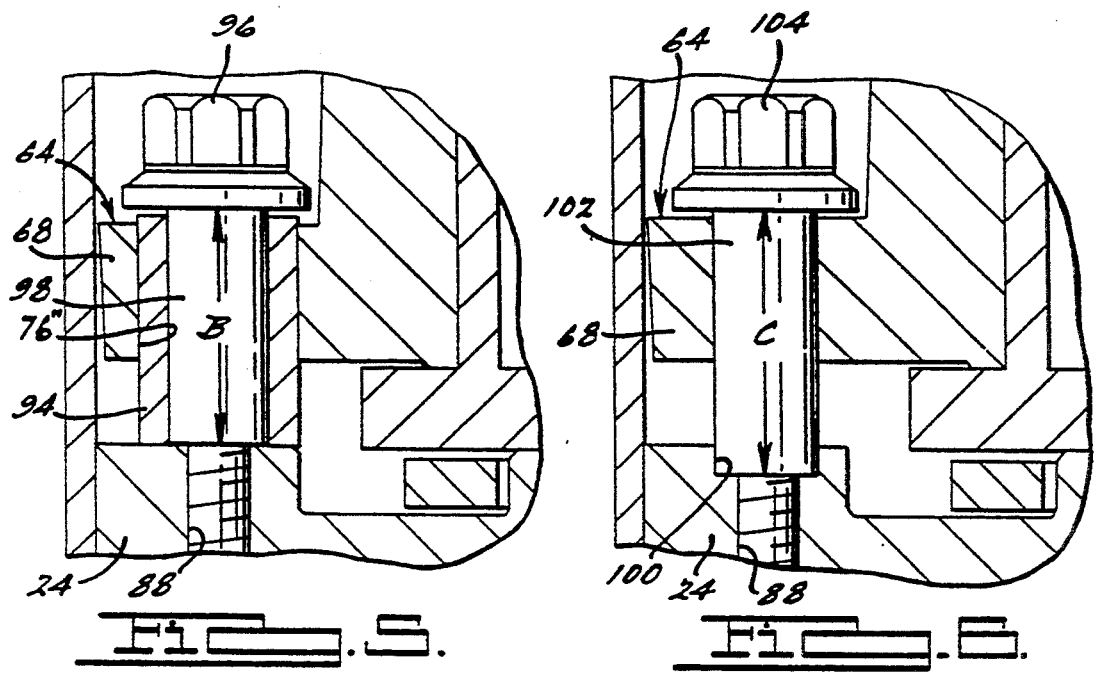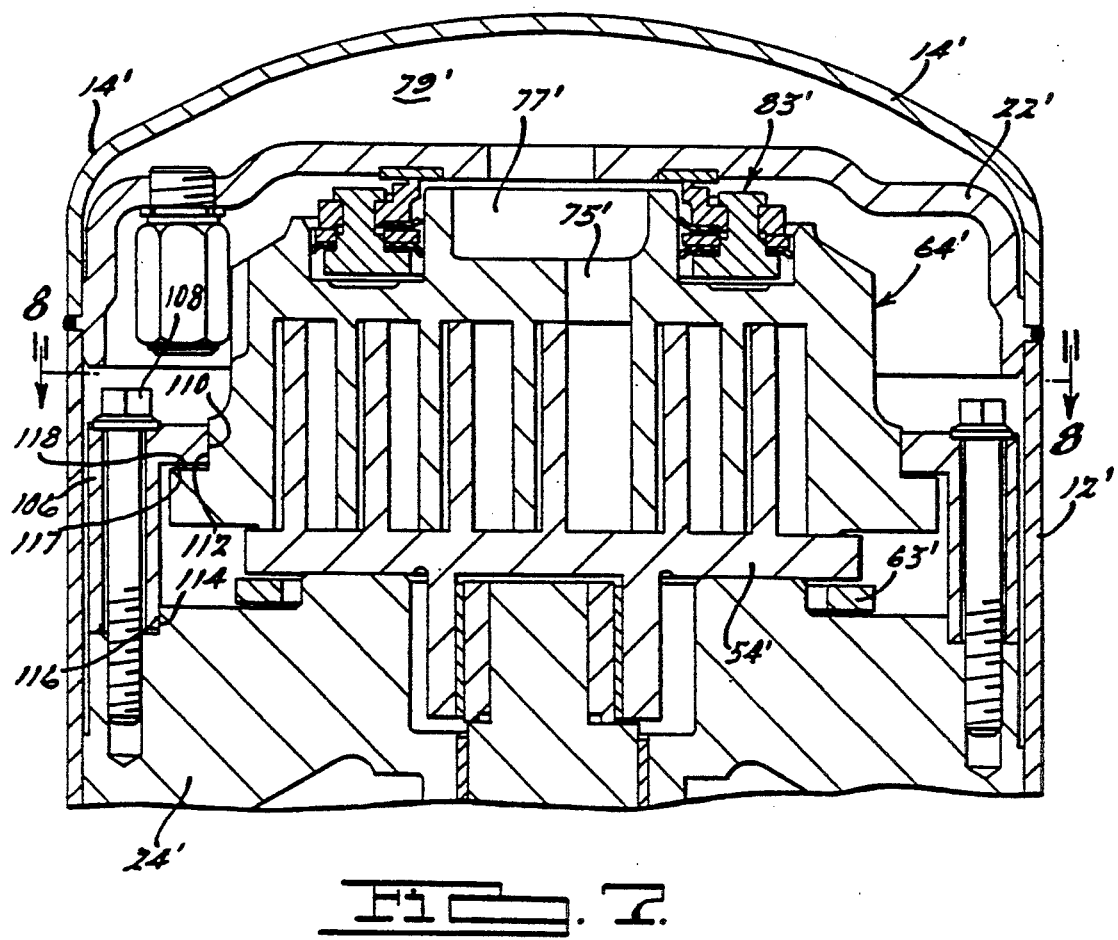

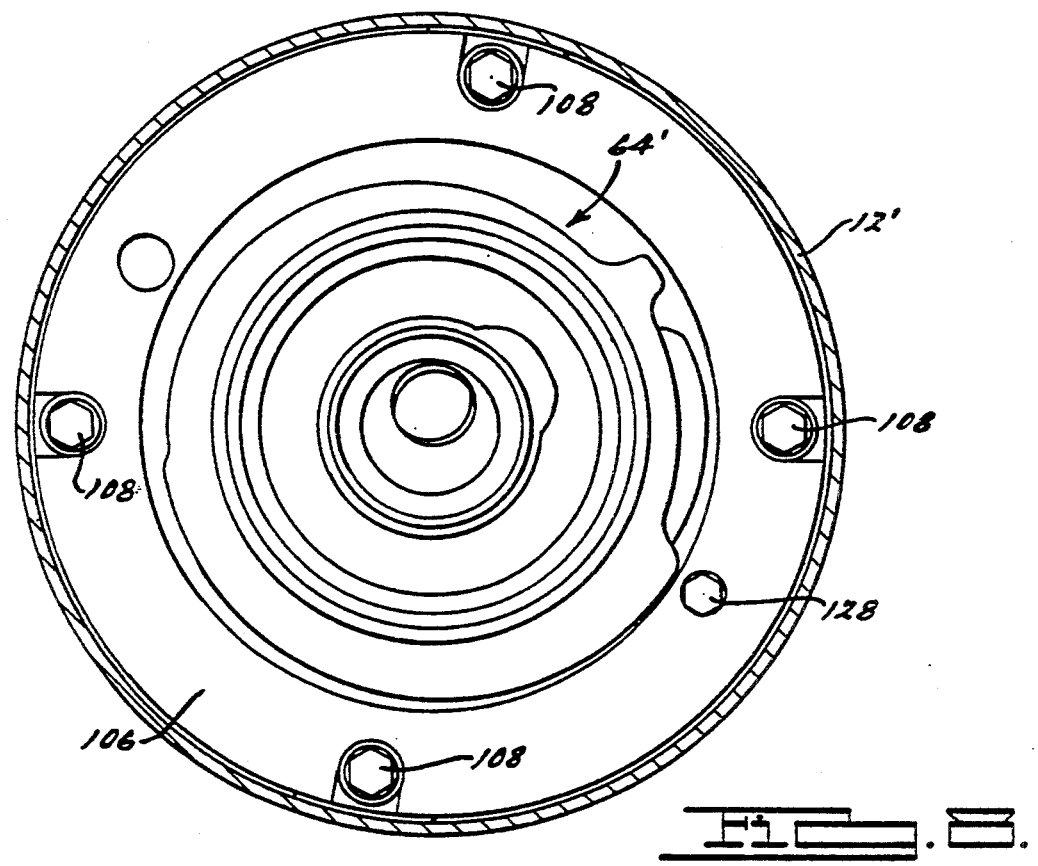
FIG. 8.
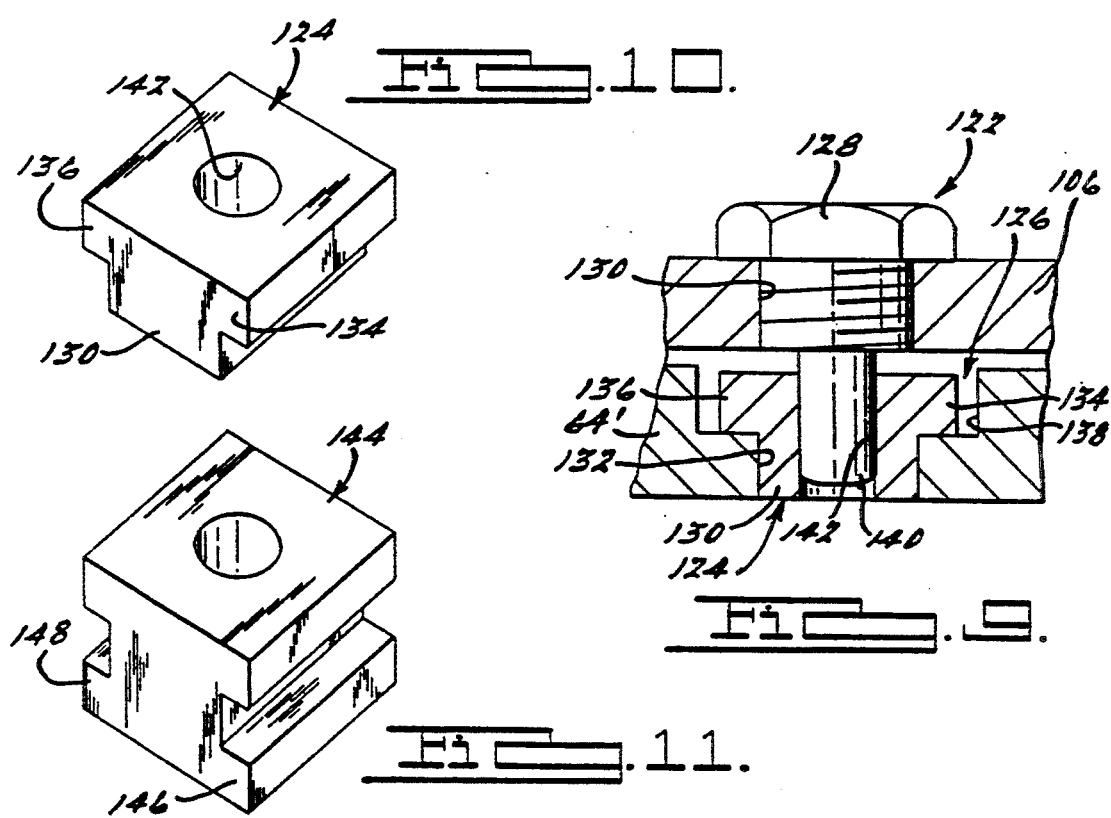
FIG. 10.
FIG. 9.
FIG. 11.

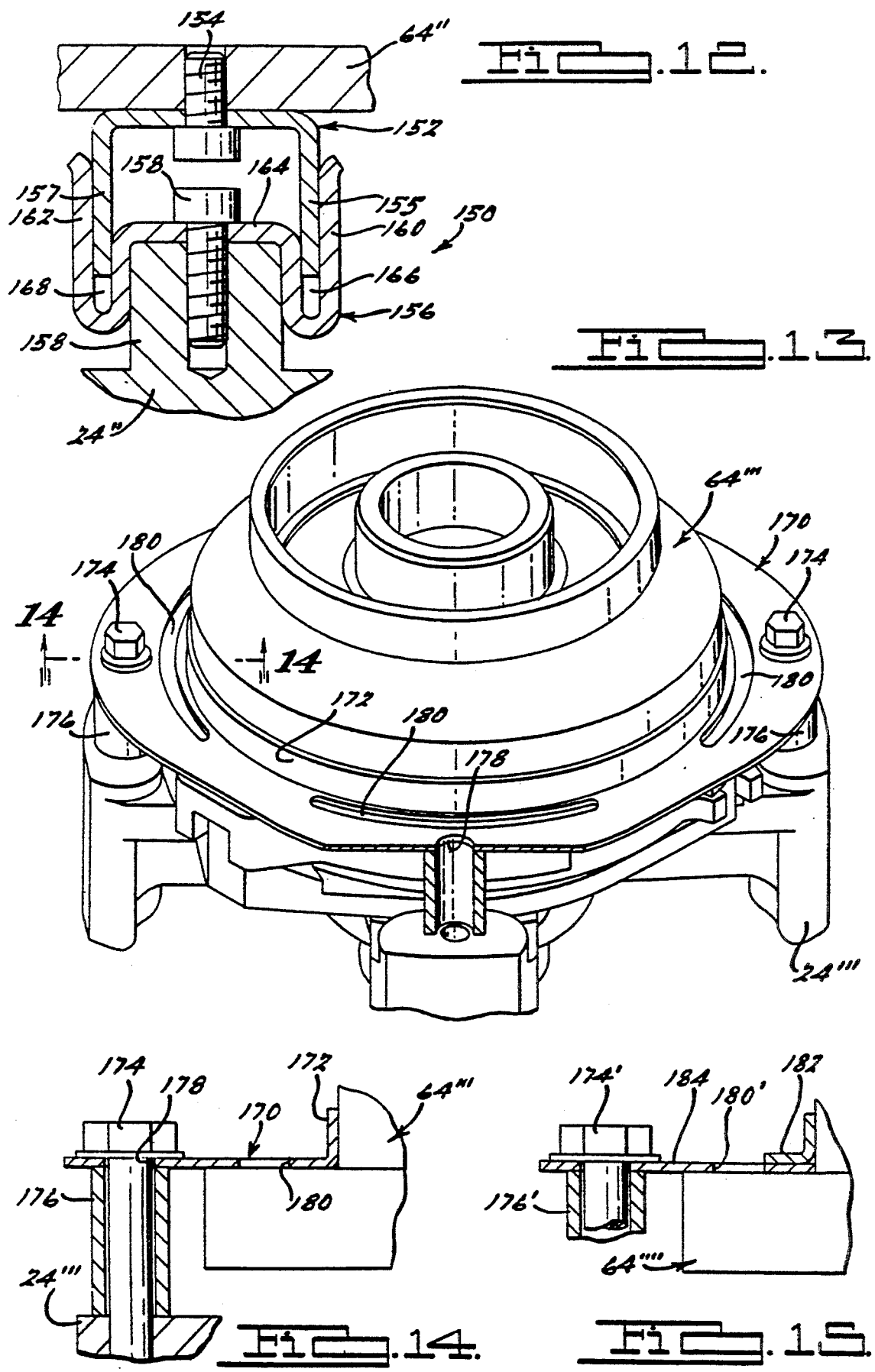

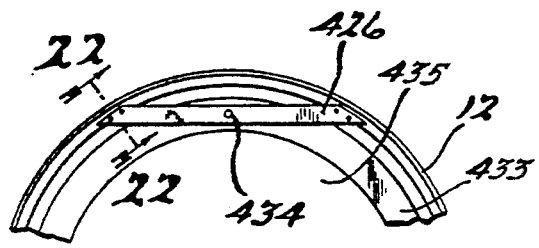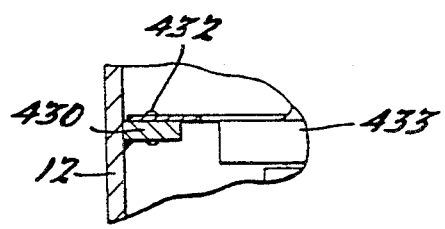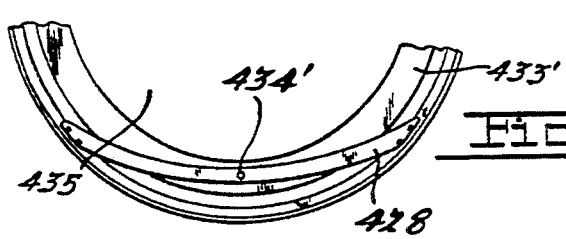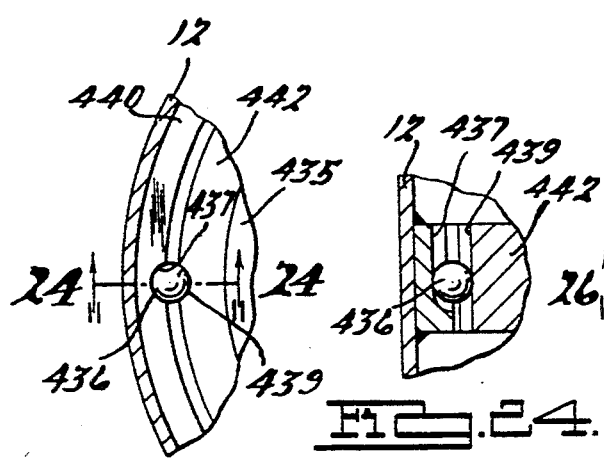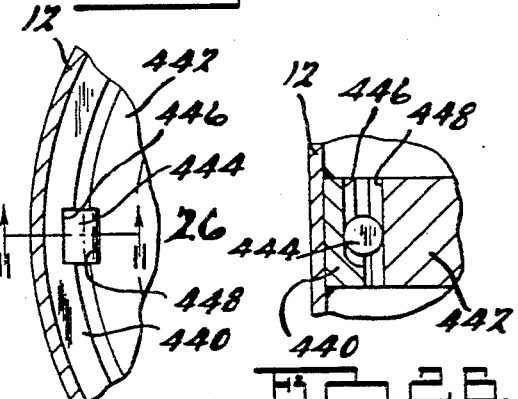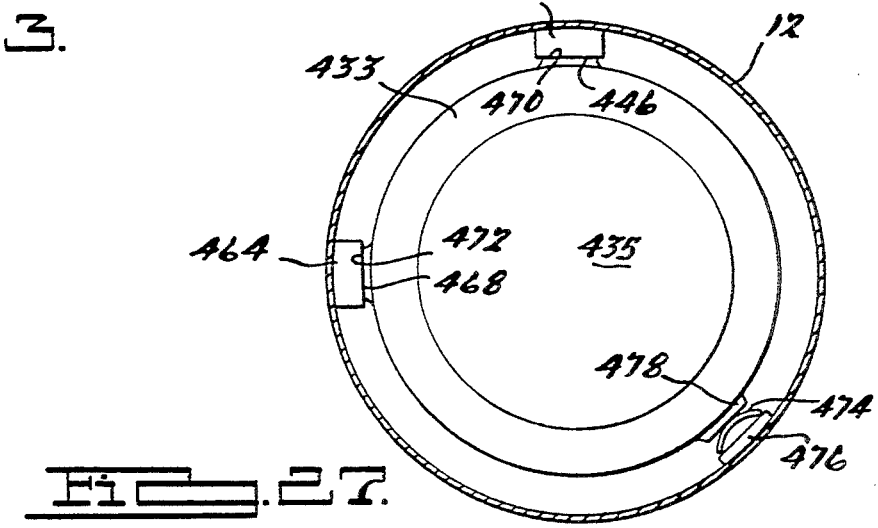

NON-ORBITING SCROLL MOUNTING ARRANGEMENTS FOR A SCROLL MACHINE

CROSS REFERENCE TO RELATED APPLICATION

This is a continuation of United States patent application Ser. No. 07/863,949, filed Apr. 6, 1992, abandoned, which is a continuation-in-part of Ser. No. 07/591,444, filed Oct. 1, 1990, now U.S. Pat. No. 5,102,316, which is a continuation-in-part of Ser. No. 07/387,699, filed Jul. 31, 1989, now U.S. Pat. No. 4,992,033, which is a division of Ser. No. 07/189,485, filed May 2, 1988, now U.S. Pat. No. 4,877,382, which is a division of Ser. No. 06/899,003, filed Aug. 22, 1986, now U.S. Pat. No. 4,767,293.

BACKGROUND AND SUMMARY OF THE INVENTION

The present invention relates generally to scroll machines and more specifically to an improved axially compliant mounting arrangement for scroll type compressors.

A unique axially compliant mounting arrangement is disclosed in the above referenced parent application Ser. No. 899,003, now U.S. Pat. No. 4,767,293. One embodiment of this mounting arrangement utilizes an elongated leaf spring strap having opposite ends secured to a flange portion provided on the non-orbiting scroll member. The center portion of this strap is secured to a pair of upstanding spaced posts provided on the main bearing housing. A stop flange is provided on the non-orbiting scroll which engages the lower surface of the strap to limit axial movement of the non-orbiting scroll member away from the orbiting scroll. A retainer overlies the center portion of the strap and serves as a backup to aid in limiting this axial separating movement of the non-rotating scroll. While this mounting arrangement offers excellent performance and durability characteristics, it requires a substantial number of components which render it rather costly in terms of both manufacturing and assembly time and material.

Accordingly, the present invention seeks to provide an improved mounting arrangement which offers all of the advantages provided by the above described mounting system but additionally requires fewer components and hence offers substantial cost savings in both manufacturing and assembly. In one embodiment, the non-orbiting scroll member is secured to the main bearing housing by means of a plurality of bolts extending therebetween which allow limited relative axial movement between the bearing housing and the non-orbiting scroll member. In another embodiment, a separate annular ring is fixedly secured to the bearing housing in surrounding relationship to the non-orbiting scroll member and includes abutment surfaces operative to allow limited relative axial movement of the non-orbiting scroll. A third embodiment is disclosed which is similar to the second embodiment except that the annular ring is integrally formed with a portion of a two piece main bearing housing and separate axial stop means and anti-rotation means are provided. In a fourth embodiment, an annular stamped ring is pressfitted or otherwise fixedly secured to the non-orbiting scroll and bolted to the bearing housing. The stamped ring offers sufficient flexibility to allow limited axial movement of the non-orbiting scroll.

Each of these embodiments offer distinct advantages with respect to overcoming the often conflicting problems of minimizing the amount of high precision machining required, the need for accurately positioning the non-orbiting scroll member relative to the orbiting scroll member, minimizing the number of components required and hence the complexity and time required for assembly as well as minimizing costs without loss of durability and/or reliability of the resulting scroll compressor.

Additional advantages and features of the present invention will become apparent from the subsequent description and the appended claims taken in conjunction with the accompanying drawings.

BRIEF DESCRIPTION OF THE DRAWINGS

FIG. 2 is a section view of the compressor of FIG. 1, the section being taken along line 2—2 thereof;

FIG. 3 is an enlarged fragmentary section view of the mounting arrangement shown in FIG. 1;

FIGS. 4–6 are views similar to that of FIG. 3 but showing other embodiments of the present invention, all in accordance with the present invention;

FIG. 7 is a fragmentary section view of a portion of a scroll compressor showing another embodiment of a non-orbiting scroll mounting arrangement in accordance with the present invention;

FIG. 8 is a section view of the embodiment shown in FIG. 7, the section being taken along line 8—8 thereof;

FIG. 9 is a section view of a slider block assembly for use in preventing rotation of the non-orbiting scroll in the embodiment of FIGS. 7 and 8;

FIG. 10 is a perspective view of the slider block shown in FIG. 9;

FIG. 11 is a perspective view of an alternative slider block for use in the embodiment of FIG. 9;

FIG. 12 is a section view of an alternative rotation limiting assembly for use in the embodiment of FIG. 7;

FIG. 13 is a perspective view of another arrangement for mounting of a non-orbiting scroll member in accordance with the present invention, portions thereof being broken away;

FIG. 14 is an enlarged fragmentary view of a portion of the mounting arrangement shown in FIG. 13;

FIG. 15 is an enlarged fragmentary section view of a modified version of the mounting arrangement shown in FIGS. 13 and 14, all in accordance with the present invention;

FIG. 21a is similar to FIG. 16 and illustrates yet a further technique for mounting the non-orbiting scroll for limited axial compliance;

FIG. 21b is a view similar to FIG. 21a but illustrates yet a further technique for mounting the non-orbiting scroll for limited axial compliance;

FIG. 22 is a sectional view taken substantially along line 22—22 in FIG. 21;

FIG. 23 is similar to FIG. 16 and illustrates yet another technique for mounting the non-orbiting scroll for limited axial compliance;

FIG. 24 is a sectional view taken substantially along line 24—24 in FIG. 23;

FIG. 25 is similar to FIG. 16 and illustrates yet a further technique for mounting the non-orbiting scroll for limited axial compliance;

FIG. 26 is a sectional view taken substantially along line 26—26 in FIG. 25;

FIG. 27 is a view similar to FIG. 21 illustrating diagrammatically yet another technique for mounting the non-orbiting scroll for limited axial compliance.

DESCRIPTION OF THE PREFERRED EMBODIMENTS

Figure 1:
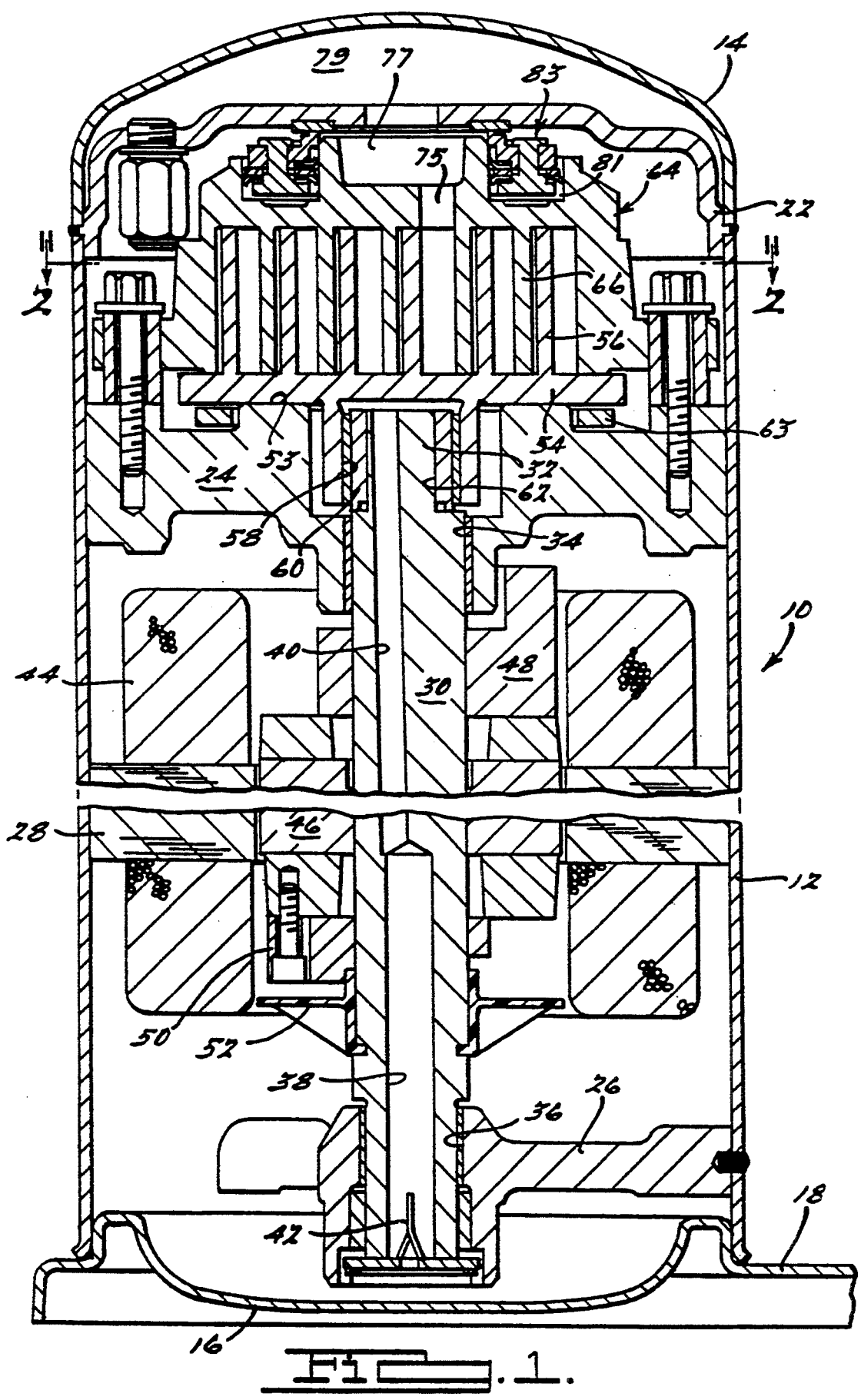
FIG. 1 is a vertical section view of a scroll compressor incorporating a non-orbiting scroll mounting arrangement in accordance with the present invention.

Referring now to the drawings and in particular to FIG. 1, a compressor 10 is shown which comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting which may have the usual discharge valve therein (not shown). Other major elements affixed to the shell include a transversely extending partition 22 which is welded about its periphery at the same point that cap 14 is welded to shell 12, a stationary main bearing housing or body 24 which is suitably secured to shell 12 and a lower bearing housing 26 also having a plurality of radially outwardly extending legs each of which is also suitably secured to shell 12. A motor stator 28 which is generally square in cross section but with the corners rounded off is pressfitted into shell 12. The flats between the rounded corners on the stator provide passageways between the stator and shell, which facilitate the flow of lubricant from the top of the shell to the bottom.

A drive shaft or crankshaft 30 having an eccentric crank pin 32 at the upper end thereof is rotatably journaled in a bearing 34 in main bearing housing 24 and a second bearing 36 in lower bearing housing 26. Crankshaft 30 has at the lower end a relatively large diameter concentric bore 38 which communicates with a radially outwardly inclined smaller diameter bore 40 extending upwardly therefrom to the top of the crankshaft. Disposed within bore 38 is a stirrer 42. The lower portion of the interior shell 12 is filled with lubricating oil, and bore 38 acts as a pump to pump lubricating fluid up the crankshaft 30 and into passageway 40 and ultimately to all of the various portions of the compressor which require lubrication.

Crankshaft 30 is rotatively driven by an electric motor including stator 28, windings 44 passing therethrough and a rotor 46 pressfitted on the crankshaft 30 and having upper and lower counterweights 48 and 50 respectively. A counterweight shield 52 may be provided to reduce the work loss caused by counterweight 50 spinning in the oil in the sump. Counterweight shield 52 is more fully disclosed in assignee's U.S. Pat. No. 5,064,356 entitled "Counterweight Shield For Scroll Compressor", the disclosure of which is hereby incorporated by reference.

The upper surface of main bearing housing 24 is provided with a flat thrust bearing surface 53 on which is disposed an orbiting scroll 54 having the usual spiral vane or wrap 56 on the upper surface thereof. Projecting downwardly from the lower surface of orbiting scroll 54 is a cylindrical hub having a journal bearing 58 therein and in which is rotatively disposed a drive bushing 60 having an inner bore 62 in which crank pin 32 is drivingly disposed. Crank pin 32 has a flat on one surface which drivingly engages a flat surface (not shown) formed in a portion of bore 62 to provide a radially compliant driving arrangement, such as shown in assignee's aforementioned U.S. Pat. No. 4,877,382, the disclosure of which is herein incorporated by reference. An Oldham coupling 63 is also provided positioned between and keyed to orbiting scroll 54 and bearing housing 24 to prevent rotational movement of orbiting scroll member 54. Oldham coupling 63 is preferably of the type disclosed in the above referenced U.S. Pat. No. 4,877,382, however, the coupling disclosed in assignee's copending application Ser. No. 591,443 entitled "Oldham Coupling For Scroll Compressor" filed Oct. 1, 1990, abandoned in favor of continuation application Ser. No. 12,630, filed Feb. 2, 1993, the disclosure of which is hereby incorporated by reference, may be used in place thereof.

A non-orbiting scroll member 64 is also provided having a wrap 66 positioned in meshing engagement with wrap 56 of scroll 54. Non-orbiting scroll 64 has a centrally disposed discharge passage 75 communicating with an upwardly open recess 77 which is in fluid communication with a discharge muffler chamber 79 defined by cap 14 and partition 22. An annular recess 81 is also formed in non-orbiting scroll 64 within which is disposed a seal assembly 83. Recesses 77 and 81 and seal assembly 83 cooperate to define axial pressure biasing chambers which receive pressurized fluid being compressed by wraps 56 and 66 so as to exert an axial biasing force on non-orbiting scroll member 64 to thereby urge the tips of respective wraps 56, 66 into sealing engagement with the opposed end plate surfaces. Seal assembly 83 is preferably of the type described in greater detail in assignee's copending application Ser. No. 591,454 filed Oct. 1, 1990 and entitled "Scroll Machine With Floating Seal", abandoned in favor of application Ser. No. 841,251, now U.S. Pat. No. 5,156,539, the disclosure of which is hereby incorporated by reference. Scroll member 64 is designed to be mounted to bearing housing 24 and to this end has a plurality of radially outwardly projecting flange portions 68, 70, 72, 74 circumferentially spaced around the periphery thereof as shown in FIG. 2.

As best seen with reference to FIG. 3, flange portion 68 of non-orbiting scroll member 64 has an opening 76 provided therein within which is fitted an elongated cylindrical bushing 78, the lower end 80 of which is seated on bearing housing 24. A bolt 82 having a head 84 and washer 85 extends through an axially extending bore 86 provided in bushing 78 and into a threaded opening 88 provided in bearing housing 24. As shown, bore 86 of bushing 78 is of a diameter greater than the diameter of bolt 82 so as to accommodate some relative movement therebetween to enable final precise positioning of non-orbiting scroll member 64. Once scroll member 64 and hence bushing 78 have been precisely positioned, bolt 82 may be suitably torqued thereby securely and fixedly clamping bushing 78 between bearing housing 24 and washer 85. Washer 85 serves to insure uniform circumferential loading on bushing 78 as well as to provide a bearing surface for head 84 thereby avoiding any potential shifting of bushing 78 during the final torquing of bolt 82. It should be noted that as shown in FIG. 3, the axial length of bushing 78 will be sufficient to allow non-orbiting scroll 64 to slidably move axially along bushing 78 in a direction away from the orbiting scroll thereby affording an axially compliant mounting arrangement with the washer 85 and head 84 of bolt 82 acting as a positive stop limiting such movement. Substantially identical bushings, bolts and washers are provided for each of the other flange portions 70, 72, and 74. The amount of separating movement can be relatively small (e.g. on the order of 0.005" for a scroll 3" to 4" in diameter and 1" to 2" in wrap height) and hence the compressor will still operate to compress even though the separating force resulting therefrom may exceed the axial restoring force such as may occur on startup. Because the final radial and circumferential positioning of the non-orbiting scroll is accommodated by the clearances provided between bolts 82 and the associated bushings 78, threaded openings 88 in bearing housing 24 need not be as precisely located as would otherwise be required thus reducing the manufacturing costs associated therewith.

Alternatively, as shown in FIG. 4, the bolts 82 and bushings 78 may be replaced by a shoulder bolt 90 slidably fitted within openings 76' provided in the respective flange portions 68, 70, 72 and 74 of non-orbiting scroll 64. In this embodiment, the axial length "A" of the shoulder portion 92 of bolt 90 will be selected such that a slight clearance will be provided between the lower surface 91 of head portion of bolt 90 and the opposed surface of flange portion 68 when scroll member 64 is fully axially seated against scroll member 56 to thereby permit a slight axial separating movement in like manner as described above with reference to FIG. 3. Also, as noted above, surface 91 of bolt 90 will act as a positive stop to limit this axial separating movement of scroll member 64. The relative diameters of shoulder portion 92 and bore 76' will be such as to allow sliding movement therebetween but yet effectively resist radial and/or circumferential movement of scroll member 64. While this embodiment eliminates concern over potential shifting of the bushing relative to the securing bolt which could occur in the embodiment of FIG. 3, it is somewhat more costly in that the threaded holes in bearing housing 24 must be precisely located.

FIGS. 5 and 6 illustrate further alternative arrangements for mounting non-orbiting scroll member 64 to bearing housing 24. In FIG. 5, a bushing 94 is pressfitted within each of the openings 76" provided in respective flange portions 68, 70, 72 and 74. A shoulder bolt 96 is provided extending through bushing 94 and as described above with reference to FIG. 4 includes a shoulder portion 98 having an axial length "B" selected with respect to the length of bushing 94 to afford the desired axial movement of the non-orbiting scroll 64. In this embodiment, because bushing 94 is pressfitted within opening 76" it will slidably move along shoulder portion 98 of bolt 96 along with scroll member 64 to afford the desired axially compliant mounting arrangement. This embodiment allows for somewhat less precise locating of the threaded bores 88 in bearing housing 24 as compared to the embodiment of FIG. 4 in that the bushing 94 may be bored and/or reamed to provide the final precise positioning of the non-orbiting scroll member 64. Further, because the axial movement occurs between the bushing and shoulder bolt, concern as to possible wearing of the openings 76" provided in the flange portions of the fixed scroll is eliminated. As shown, bushing 94 has an axial length such that it is seated on bearing housing 24 when scroll member 64 is fully axially seated against scroll member 54 so as to provide a maximum surface area of engagement with shoulder portion 98, however, if desired, a shorter bushing 94 could be utilized in place thereof. Again, as in the above described embodiments, the head of bolt 96 will cooperate either with the end of bushing 94 or flange 68 as desired to provide a positive stop limiting the axial separating movement of scroll 64.

In the embodiment of FIG. 6, a counterbore 100 is provided in bearing housing 24 which counterbore serves as a pilot to receive an extended shoulder portion 102 of shoulder bolt 104. Again the axial length C of shoulder portion 102 will be selected so as to allow for the desired limited axial movement of non-orbiting scroll 64 and the head of bolt 104 will provide a positive stop therefor. Because the pilot counterbore can be reamed to establish the precise relative location of the non-orbiting scroll, the tolerance for locating the threaded bore may be increased somewhat. Further, this embodiment eliminates the need to provide and assemble separately fabricated bushings. Also, similarly to that described above, the relative diameters of shoulder portions 98 and 102 with respect to the bores through which they extend will be such as to accommodate axial sliding movement yet resist radial and circumferential movement.

A further embodiment of the present invention is illustrated in FIG. 7 wherein corresponding portions are indicated by the same reference numbers used in FIG. 1 primed. In this embodiment a separate annular retainer ring 106 is provided which surrounds non-orbiting scroll 64' and is securely bolted to bearing housing 24' by a plurality of fasteners 108.

Retainer ring 106 is generally L-shaped in cross section and includes an accurately machined inner peripheral surface 110 which is adapted to abut a corresponding accurately machined annular surface 112 provided on non-orbiting scroll 64' to thereby accurately radially position same as well as to guide axial movement thereof. Additionally, retainer ring 106 has an accurately machined radially inwardly facing surface portion 114 which is adapted to abut accurately machined radially outwardly facing shoulder portion 116 formed on bearing housing 24' so as to thereby accurately locate retainer ring 106 with respect thereto. This mounting arrangement also incorporates the axially compliant feature discussed above by providing a slight clearance between surface 117 of retainer ring 106 and an opposed surface 118 provided on scroll 64' both of which surfaces are accurately machined so as to provide a positive stop limiting this axial separating movement.

In order to prevent relative rotation of the non-orbiting scroll 64' with respect to retainer ring 106 and hence bearing housing 24', a slider block assembly 122 is provided on retainer ring 106. As best seen with reference to FIGS. 9–11, slider block assembly 122 comprises a block member 124 which is received within a suitably shaped radially extending slot 126 provided in a radially outwardly extending flange portion of the non-orbiting scroll member 64'. Block member 124 is generally T-shaped in cross section having a depending leg portion 130 received within a narrower portion 132 of slot 126 and oppositely extending arms 134, 136 loosely received within an upper portion 138 of slot 126 which arms serve to support block member 124 on scroll member 64'. A bolt 128 is threadedly secured within an opening 131 provided in retainer ring 106 and has a depending shaft portion 140 extending into a central opening 142 provided in block 124.

In operation, the close tolerance fit of both shaft portion 140 within bore 142 and the opposite circumferentially spaced sidewalls of leg portion 130 with the circumferentially opposed sidewalls of the lower portion 132 of slot 126 will cooperate to effectively prevent rotational movement of the non-orbiting scroll member. Further, because block 124 is free to move axially along shaft portion 140 of bolt 128, this anti-rotation assembly will not restrict the desired axial movement of the non-orbiting scroll member discussed above. Preferably, slide block 124 will be fabricated from metal.

An alternative slide block 144 is shown in FIG. 11. Slide block 144 is similar to slide block 124 with the exception that it includes a lower pair of circumferentially outwardly extending flange portions 146, 148 which may underlie the lower surface of the non-orbiting scroll 64' to thereby aid in retaining slide block 144 within slot 126.

Alternatively, in place of the slide block assembly described above, an anti-rotation clip assembly 150 may be utilized to prevent relative rotation of the non-orbiting scroll member. As shown in FIG. 12, clip assembly 150 includes a generally U-shaped first clip member 152 having a center portion secured to the undersurface of a flange portion of the non-orbiting scroll 64" by means of a suitable threaded fastener 154 and a pair of spaced substantially parallel depending leg members 155, 157. A second clip member 156 is secured to an upstanding post 158 integrally formed at a suitable location on main bearing housing 24" by means of a suitable threaded fastener. Second clip member 156 has a pair of spaced substantially parallel upwardly extending arm members 160, 162 and a raised center portion 164 seated on post 158 which together define a pair of spaced channels 166, 168 adapted to receive legs 155, 157 of first clip member 152. Clip members 152 and 156 will be aligned along a radius of the non-orbiting scroll member such that channels 166, 168 and legs 155, 157 will operate to prevent relative rotation between bearing housing 24" and non-orbiting scroll 64". Additionally, the slip fit connection between clip members 152 and 156 will accommodate the desired relative axial movement of non-orbiting scroll member 64" as noted above.

A further embodiment of an axially compliant non-orbiting scroll mounting arrangement is shown in FIGS. 13 and 14 wherein components corresponding to those shown in FIG. 1 are indicated by the same reference numbers triple primed. In this embodiment, an annular ring 170 is provided which is preferably formed from a suitable flexible sheet metal such as spring steel and is pressfitted on non-orbiting scroll member 64'''. An axially extending flange portion 172 extends around the inner periphery of ring 170 and abuts against an axially extending flange portion of non-orbiting scroll member 64''' so as to increase the engaging surface area therebetween. Ring 170 is in turn secured to bearing housing 24''' by means of a plurality of bolts 174 and sleeves 176. Preferably openings 178 in ring 170 through which bolts 174 extend will be somewhat larger in diameter than bolts 174 so as to reduce the need for precisely locating each of the taped holes in bearing housing 24''' which receive respective bolts 174.

A plurality of arcuate cutouts 180 are provided in ring 170 each being located just radially outwardly of flange 172, centered on respective bolts 174 and extending circumferentially in opposite directions therefrom. Cutouts 180 serve to increase the flexibility of ring 170 so as to accommodate the desired limited axial movement of non-orbiting scroll member 64''' as noted above. While it is believed that the pressfit engagement of ring 170 with scroll member 64''' will be sufficient to resist any relative rotational movement therebetween, additional securement means such as a pin or the like may be utilized to prevent same if desired.

An alternative embodiment of a retaining ring 184 is shown in FIG. 15. In this embodiment internally formed flange 172 is deleted and a separate retaining ring 182 is utilized to aid in securing ring 184 to non-orbiting scroll member 64''''. Retaining ring 182 is generally L-shaped in cross section and sized to provide a secure pressfit engagement with non-orbiting scroll member 64''''. The radially extending flange portion of retaining ring 182 may be secured to ring 184 in any suitable manner so as to insure against relative rotation therebetween. Retaining ring 182 will preferably be secured to the bearing housing by means of bolts 174' and sleeves 176' in a like manner as described above with respect to ring 170. Also, retaining ring 184 will include cutouts 180' similar to those provided on ring 170.

In FIGS. 16 through 20, there are illustrated a number of other suspension systems which have been discovered for mounting the non-orbiting scroll member for limited axial movement, while restraining same from a radial and circumferential movement. Each of these embodiments including those described above with reference to FIGS. 1 through 15, may function to mount the non-orbiting scroll member approximately at its mid-point, so as to balance the tipping moments on the scroll member created by radial fluid pressure forces.

Figure 16:
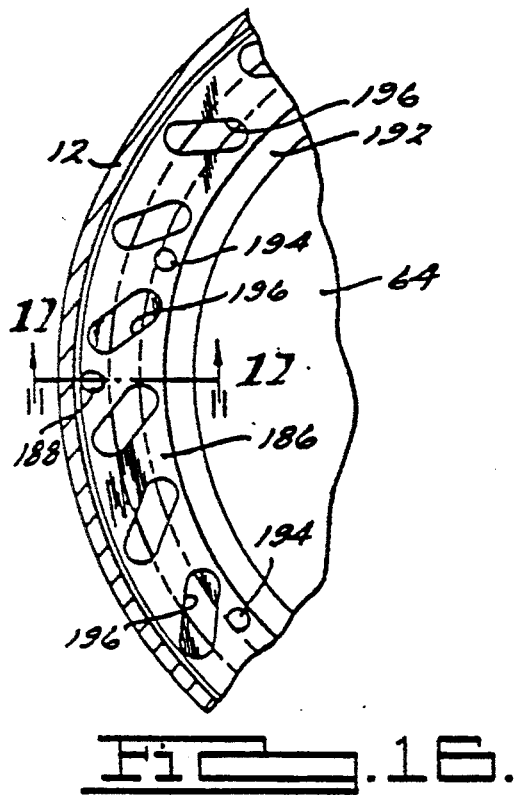
FIG. 16 is a fragmentary somewhat diagrammatic horizontal sectional view illustrating a different technique for mounting the non-orbiting scroll for limited axial compliance.
Figure 17:
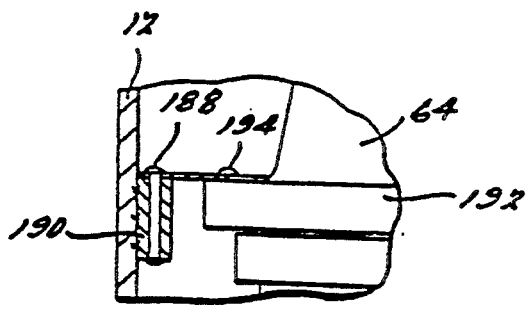
FIG. 17 is a sectional view taken substantially along line 17—17 in FIG. 16.

With reference to FIGS. 16 and 17, support is maintained by means of a spring steel ring 186 anchored at its outer periphery by means of fasteners 188 to a mounting ring 190 affixed to the inside surface of shell 12, and at its inside periphery to the upper surface of flange 192 on non-orbiting scroll member 64 by means of fasteners 194. Ring 186 is provided with a plurality of angled openings 196 disposed about the full extent thereof to reduce the stiffness thereof and permit limited axial excursions of the non-orbiting scroll member 64. Because openings 196 are slanted with respect to the radial direction, axial displacement of the inner periphery of the ring with respect to the outer periphery thereof does not require stretching of the ring, but will cause a very slight rotation. This very limited rotational movement is so trivial, however, that it is not believed it causes any significant loss of efficiency.

Figure 18:
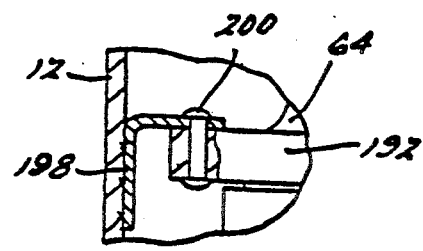
FIG. 18 is a sectional view similar to FIG. 17 but showing a further technique for mounting the non-orbiting scroll for limited axial compliance.

In the embodiment of FIG. 18, non-orbiting scroll 64 is very simply mounted by means of a plurality of L-shaped brackets 198 welded on one leg to the inner surface of shell 12 and having the other leg affixed to the upper surface of flange 192 by means of a suitable fastener 200. Bracket 198 is designed so that it may stretch slightly within its elastic limit to accommodate axial excursions of the non-orbiting scroll.

Figure 19:
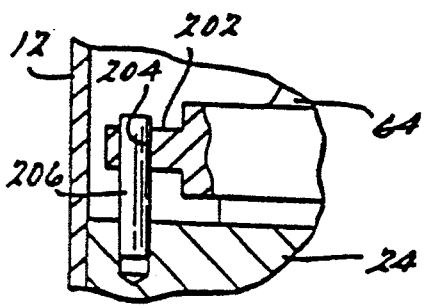
FIGS. 19 and 20 are views similar to FIG. 17 illustrating two additional somewhat similar techniques for mounting the non-orbiting scroll for limited axial compliance.
Figure 20:
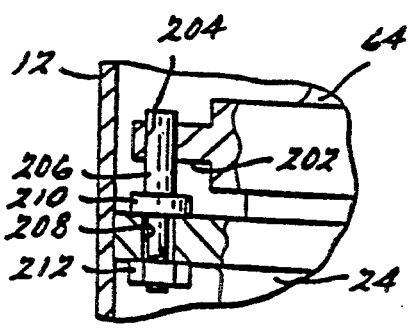

In the embodiment of FIG. 19, the non-orbiting scroll 64 is provided with a centrally disposed flange 202 having an axially extending hole 204 extending therethrough. Slidingly disposed within hole 204 is a pin 206 tightly affixed at its lower end to housing 24. As can be visualized, axial excursions of the non-orbiting scroll are possible whereas circumferential or radial excursions are prevented. The embodiment of FIG. 20 is identical to that of FIG. 19 except that pin 206 is adjustable. This is accomplished by providing an enlarged hole 208 in a suitable flange on housing 24 and providing pin 206 with a support flange 210 and a threaded lower end projecting through hole 208 and having a threaded nut 212 thereon. Once pin 206 is accurately positioned, nut 212 is tightened to permanently anchor the parts in position.

In FIGS. 21 through 27, there are illustrated a number of other suspension systems which have been discovered for mounting the non-orbiting scroll member for limited axial movement, while restraining same from a radial and circumferential movement. Each of these embodiments disclose mounting arrangements that provide reaction to the non-orbiting scroll at substantially the mid point between the end plates of the scroll members as in the first embodiment, so as to balance the tipping moments on the scroll member created by radial fluid pressure forces.

In the embodiment of FIGS. 21a, 21b and 22, the non-orbiting scroll is supported for limited axial movement by means of leaf springs or straps 426 and 428 which are affixed at their outer ends to a mounting ring 430 welded to the inside surface of shell 12 by suitable fasteners 432, and to the upper surface of radially outwardly extending flange 433' of non-orbiting scroll 435 in the center thereof by means of a suitable fastener 434'. The leaf springs can either be straight, as in the case of spring 426, or arcuate, as in the case of spring 428. Slight axial excursions of scroll member 435 will cause stretching of the leaf springs within their elastic limit.

In the embodiment of FIGS. 23 and 24 radial and circumferential movement of non-orbiting scroll 435 is prevented by a plurality of spherical balls 436 (one shown) tightly fit within a cylindrical bore defined by a cylindrical surface 437 on the inner peripheral edge of a mounting ring 440 welded to the inside surface of shell 12 and by a cylindrical surface 439 formed in the radially outer peripheral edge of a flange 442 on non-orbiting scroll 435, the balls 436 lying in a plane disposed midway between the end plate surfaces of the scroll members for the reasons discussed above. The embodiment of FIGS. 25 and 26 is virtually identical to that of FIGS. 23 and 24 except instead of balls, there are utilized a plurality of circular cylindrical rollers 444 (one of which is shown) tightly fitted within a rectangular slot defined by surface 446 on ring 440 and surface 448 on flange 442. Preferably ring 440 is sufficiently resilient that it can be stretched over the balls or rollers in order to pre-stress the assembly and eliminate any backlash.

In the embodiment of FIG. 27, the inside surface of shell 12 is provided with two bosses 462 and 464 having accurately machined, radially inwardly facing flat surfaces 466 and 468, respectively, disposed at right angles with respect to one another. Flange 433 on non-orbiting scroll 435 is provided with two corresponding bosses each having radially outwardly facing flat surfaces 470 and 472 located at right angles with respect to one another and engaging surfaces 466 and 468, respectively. These bosses and surfaces are accurately machined so as to properly locate the non-orbiting scroll in the proper radial and rotational position. To maintain it in that position while permitting limited axial movement thereof there is provided a very stiff spring in the form of a Belleville washer or the like 474 acting between a boss 476 on the inner surface of shell 12 and a boss 478 affixed to the outer periphery of flange 433. Spring 474 applies a strong biasing force against the non-orbiting scroll to maintain it in position against surfaces 466 and 468. This force should be slightly greater than the maximum radial and rotational force normally encountered tending to unseat the scroll member. Spring 474 is preferably positioned so that the biasing force it exerts has equal components in the direction of each of bosses 462 and 464 (i.e., its diametrical force line bisects the two bosses). As in the previous embodiments, the bosses and spring force are disposed substantially midway between the scroll member end plate surfaces, in order to balance tipping moments.

In all of the embodiments of FIGS. 13 through 27 it should be appreciated that axial movement of the non-orbiting scrolls in a separating direction can be limited by any suitable means, such as the mechanical stop described in the first embodiment. Movement in the opposite direction is, of course, limited by the engagement of the scroll members with one another.

Figure 28:
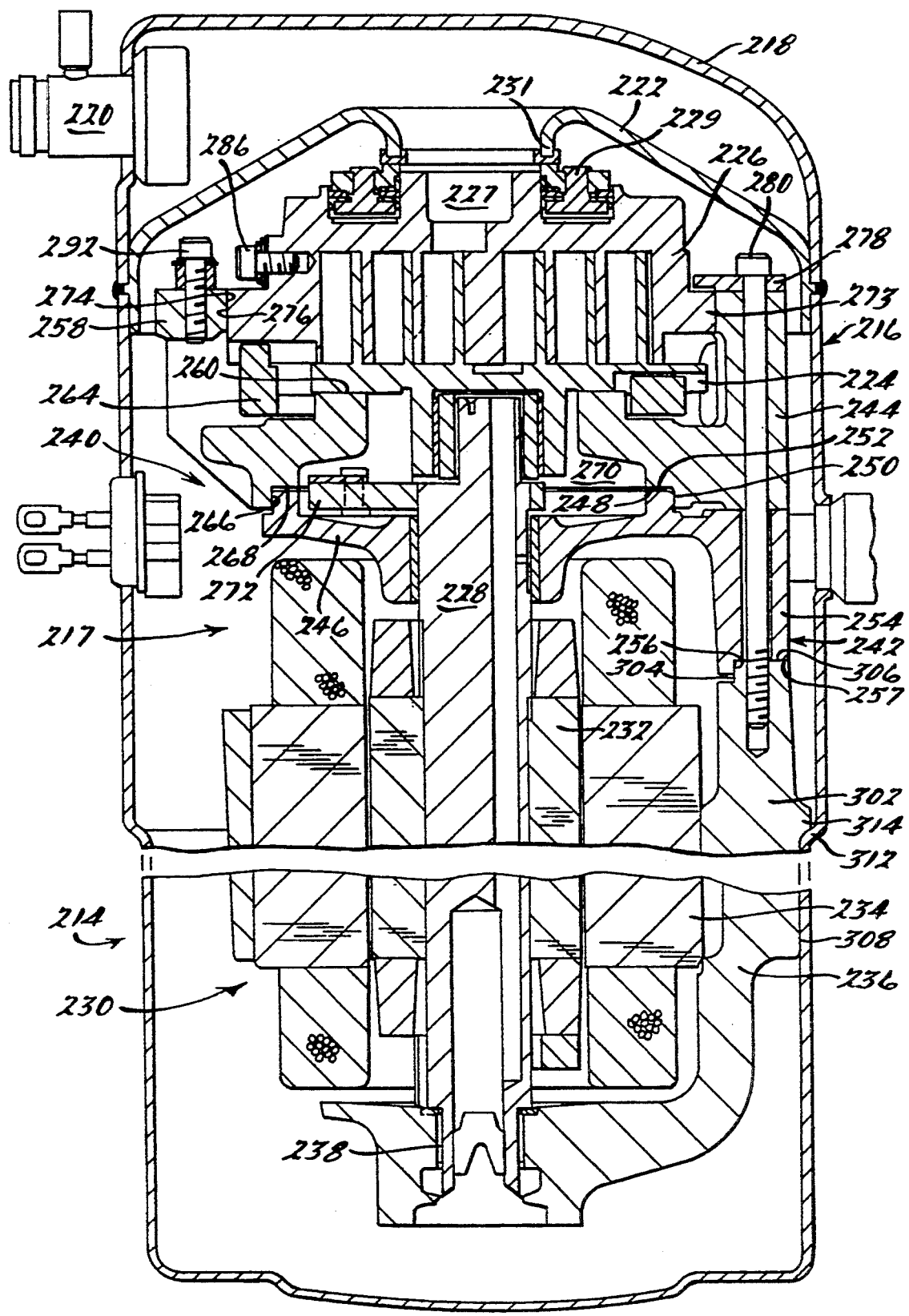
FIG. 28 is a view similar to that of FIG. 1 but illustrating another embodiment of the present invention.

Another embodiment of the present invention is shown and will be described with reference to FIGS. 28–30. With reference to FIG. 28, a scroll compressor 214 is shown which is generally similar to scroll compressor 10 illustrated in FIG. 1 and includes an outer shell 216 including a cap 218 having a discharge fitting 220 secured thereto, and a transversely extending partition 222. Intermeshed orbiting and non-orbiting scroll members 224, 226 respectively are disposed within shell 216 along with a crankshaft 228 operatively connected to orbiting scroll member 224, a driving motor 230 including a rotor 232 affixed to crankshaft 228 and a stator 234 for effecting orbital motion of orbiting scroll member 224. A lower bearing housing 236 is also provided which is supported within and by outer shell 216. Stator 234 is supported within lower bearing housing 236 as is a bearing 238 within which the lower end of crankshaft 228 is journaled. The upper end of crankshaft 228 is rotatably supported by a main bearing assembly 240 which is secured to and supported within shell 216 by lower bearing housing 236. The operation of scroll compressor 214 as well as the other components and optional components incorporated therein are substantially the same as described above with reference to FIG. 1.

Figure 29:
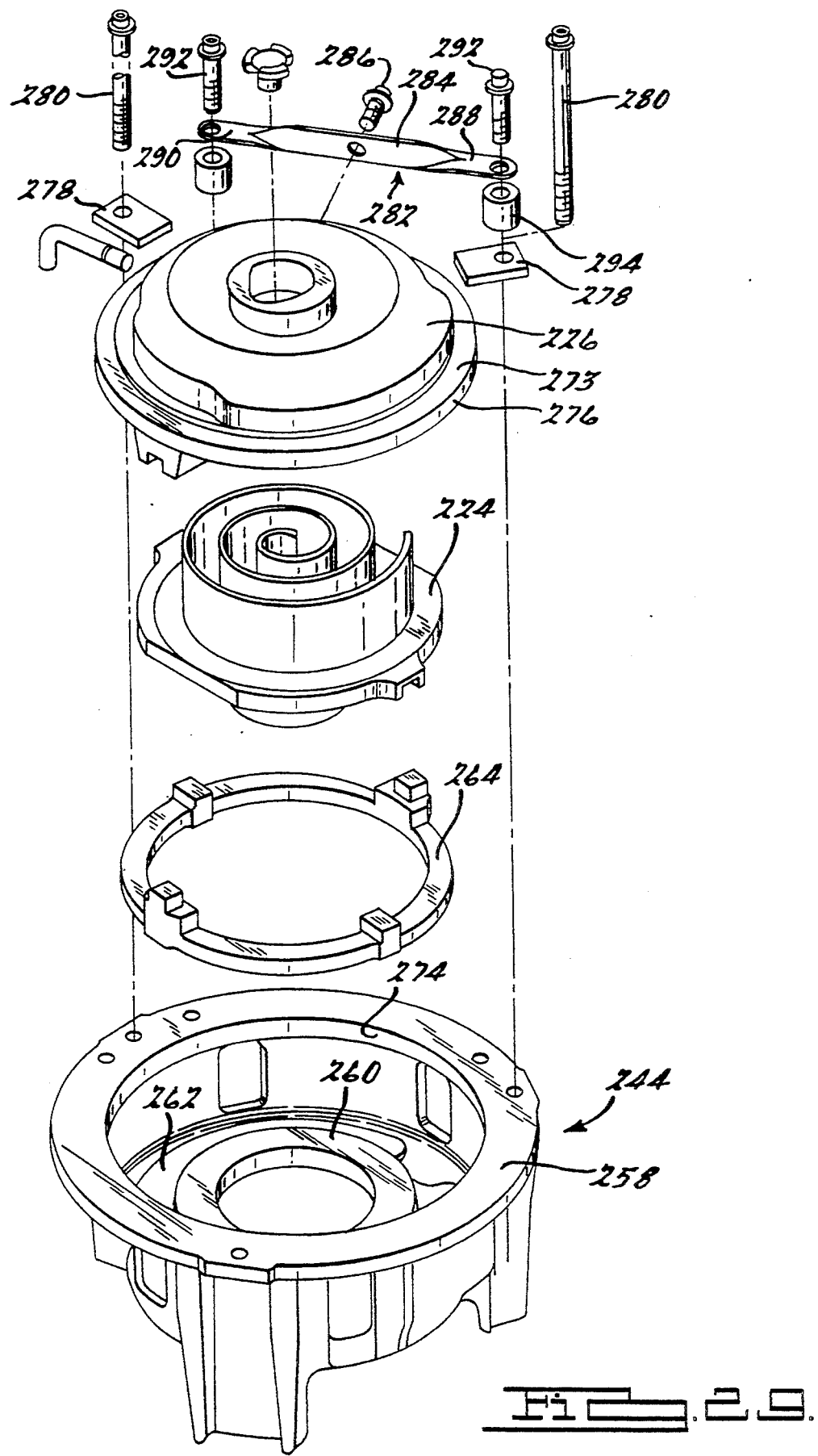
FIG. 29 is an exploded perspective view of the scroll assembly incorporated in the embodiment of FIG. 28.
Figure 30:
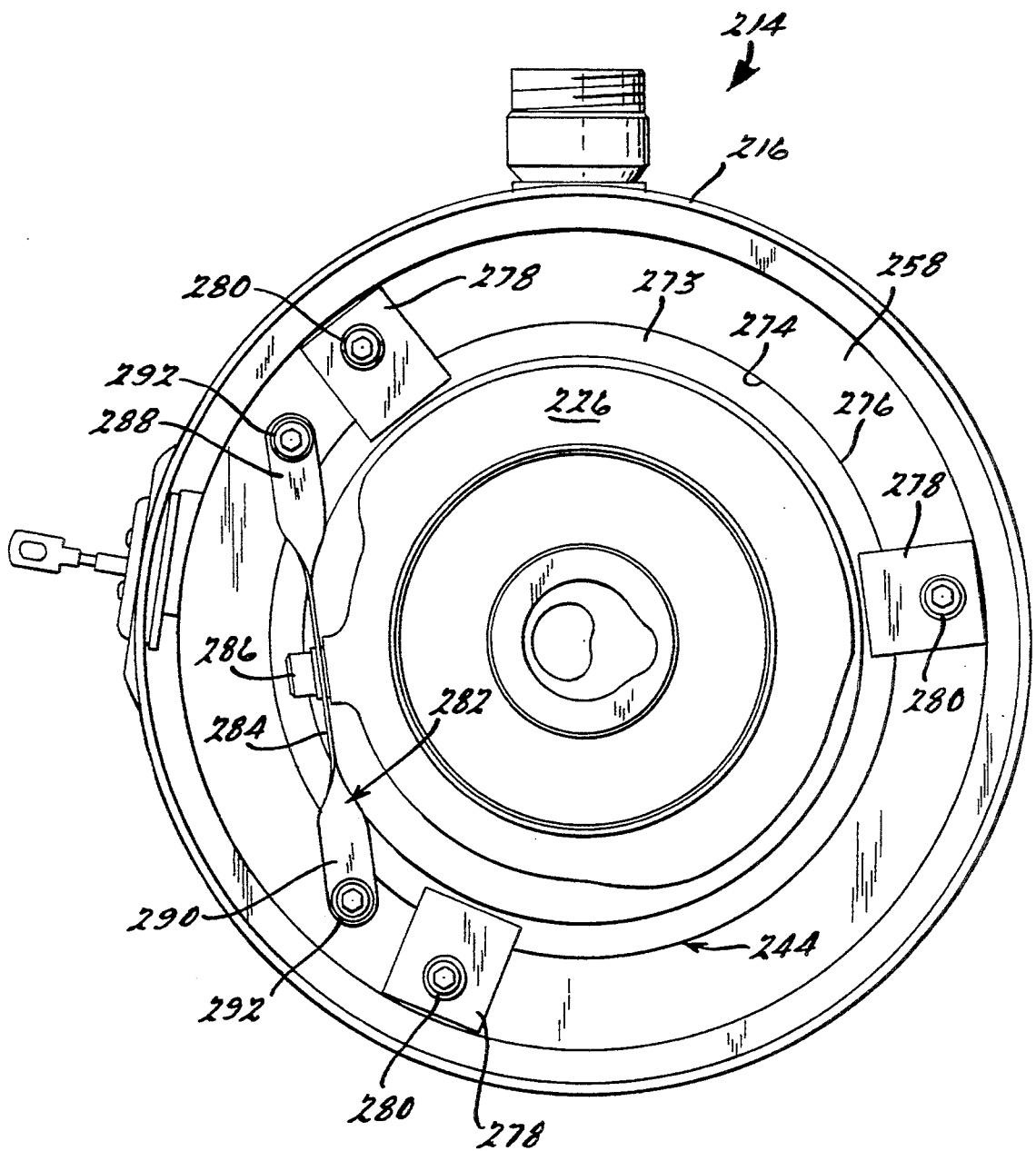
FIG. 30 is a plan view of the embodiment of FIG. 28, showing the securement for the anti-rotation strap.

As best seen with reference to FIGS. 28 and 29, main bearing assembly 240 includes a lower portion 242 and an upper portion 244. The lower portion 242 has a generally cylindrically shaped central portion 246 within which the upper end of shaft 228 is rotatably supported by means of a suitable bearing. An upstanding annular projection 248 is provided on lower portion 242 adjacent the outer periphery of central portion 246 and includes accurately machined radially outwardly facing and axially upwardly facing locating surfaces 250, 252 respectively. A plurality of radially circumferentially spaced supporting arms 254 extend generally radially outwardly from central portion 246 and include depending portions adapted to engage and be supported on lower bearing housing 236. A step 256 is provided on the terminal end of the depending portion of each of he supporting arms 254 which is designed to mate with a corresponding recess provided on the abutting portion of lower bearing housing 236 for aiding in radially positioning lower portion 242 with respect to lower bearing housing 236.

Upper portion 244 of main bearing assembly 240 as best seen with reference to FIG. 29 is generally cup-shaped including an upper annular guide ring portion 258 integrally formed therewith, an annular axial thrust bearing surface 260 disposed below ring portion 258, and a second annular supporting bearing surface 262 positioned below and in radially outwardly surrounding relationship to axial thrust bearing surface 258. As shown in FIG. 28, axial thrust bearing surface 260 serves to axially movably support orbiting scroll member 224, and supporting bearing surface 262 provides support for Oldham coupling 264. The lower end of upper portion 244 includes an annular recess defining radially inwardly and axially downwardly facing surfaces 266, 268 respectively which are designed to mate with surfaces 250 and 252 of lower portion 242 to aid in axially and radially positioning upper and lower portions 242, 244 relative to each other. Additionally, a cavity 270 is defined between upper and lower portions 244, 242 of main bearing assembly 240 positioned in surrounding relationship to the upper end of crankshaft 228. Cavity 270 is designed to accommodate rotational movement of a counterweight 272 secured to shaft 228 at the upper end thereof. The provision of this cavity enables counterweight to be positioned in closer proximity to orbiting scroll member 224 thus enabling the overall size thereof to be reduced. Additionally, the axial height of counterweight as well as the mass thereof can be further reduced as compared to counterweight 48 shown in FIG. 1 because the radial dimension thereof can be increased beyond the diameter of the rotor due to its relative positioning.

Annular integrally formed guide ring 258 is positioned in surrounding relationship to a radially outwardly extending flange portion 272 of non-orbiting scroll member 226 and includes a radially inwardly facing surface 274 adapted to slidingly abut a radially outwardly facing surface 276 of flange portion 272 so as to radially position and guide axial movement of non-orbiting scroll member 226. In order to limit the axial movement of non-orbiting scroll member 226 in a direction away from orbiting scroll member 224, a plurality of stop members 278 are provided which are secured to the top surface of annular ring 258 by bolts 280. Each of the stop members 278 includes a radially inwardly extending portion which is adapted to overlie an upper surface of flange portion 272 of non-orbiting scroll member 226 and cooperate therewith to limit axial upward movement of the non-orbiting scroll member. As shown in FIG. 28, bolts 280 also serve to both secure upper and lower portions 244, 242 of main bearing assembly together as well as to secure this assembly to lower bearing housing 236. It should also be noted that the axial positioning of stop member 278 will be accurately controlled relative to the corresponding opposed surface of flange 272 to allow slight limited axial movement of non-orbiting scroll member 226. Alternatively, separate bolts could be utilized to secure stop members 278 to the upper surface of flange portion 272 or bolts 292 could be employed for this purpose. In the event such separate bolts are utilized, it may be desirable to recess the heads of bolts 280 below the upper surface of guide ring 258 to minimize the overall length thereof.

In order to prevent rotational movement of non-orbiting scroll member 226, an anti-rotation strap 282 is provided which includes a center portion 284 designed to be secured to non-orbiting scroll member 226 by bolt 286. The opposite ends 288, 290 of strap 282 are each secured to the upper surface of annular ring 258 by means of bolts 292 and spacers 294. As shown, the center portion of strap 282 is secured to an axially extending radially outwardly facing sidewall portion of scroll member 226 and hence lies in a plane rotated approximately 90° from the plane in which the respective outer end portions of the strap lie. This twisted construction of anti-rotation strap 282 serves not only to facilitate securement of the mid portion thereof to the non-orbiting scroll member but also aids in minimizing the concentration of stresses along the outer edges thereof.

It should be noted that the operation and function served by integral guide ring 258 is substantially the same as that described above with respect to the embodiment of FIG. 7. Additionally, while the embodiment of FIG. 28 has been illustrated in connection with a preferred axial complement mounting arrangement, any of the other mounting arrangements may be utilized in place thereof if desired. Similarly, the axially compliant mounting arrangement of FIG. 28 could be utilized in connection with any of the other embodiments disclosed herein. Lastly, it should be noted that the axial positioning of both flange 272 and guide ring 258 is approximately midway between the respective wrap tip and end plate of non-orbiting scroll member 226 and thus serves to minimize the tipping moment exerted thereon in the same manner as described above.

Figure 31:
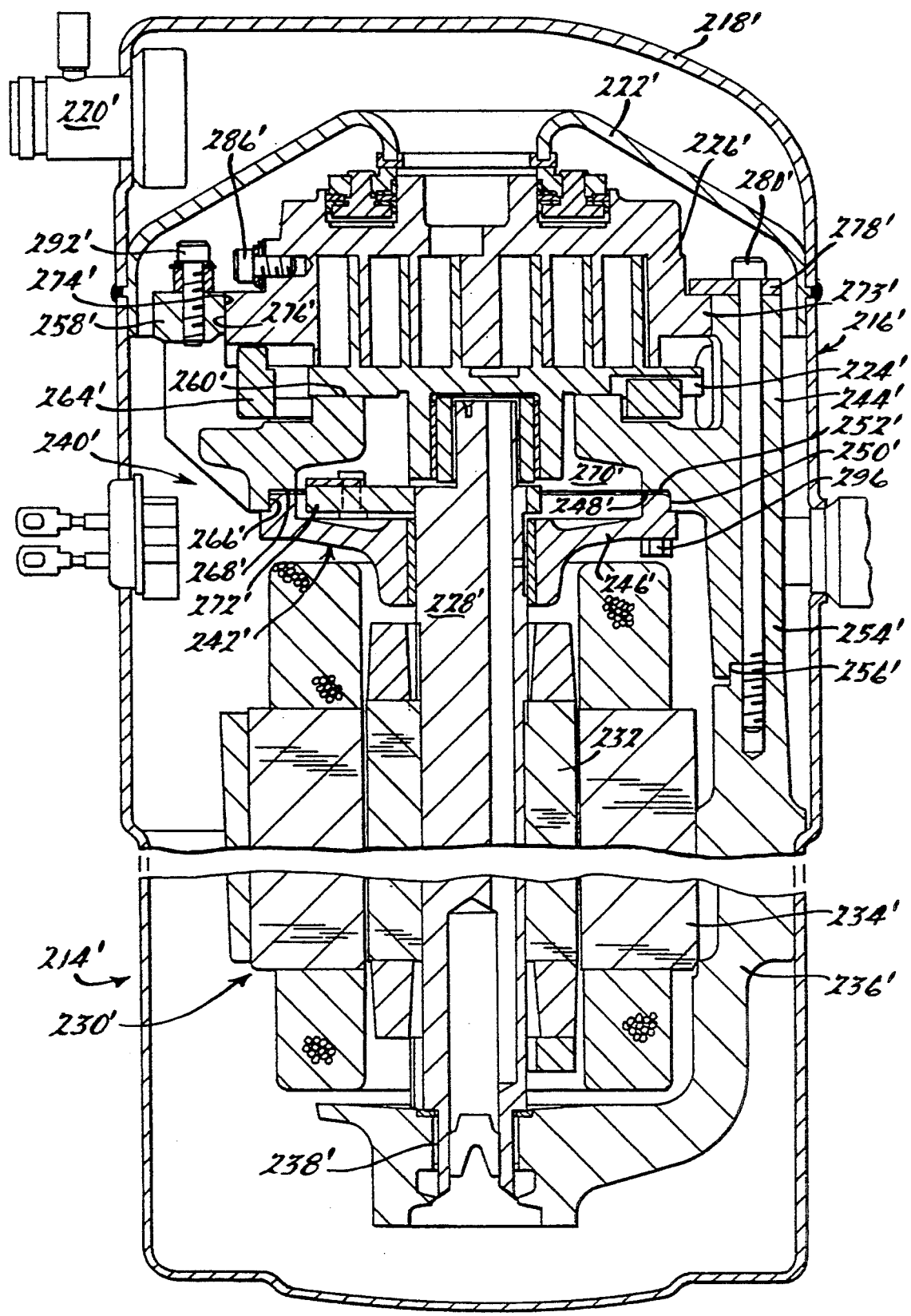
FIG. 31 is a view similar to FIG. 28 but showing another alternative embodiment of the main bearing assembly in accordance with the present invention.

Another embodiment of the compressor 214 of FIG. 28 is shown in FIG. 31 wherein corresponding portions thereof are indicated by the same reference numbers primed. Compressor 214' is substantially identical to compressor 214 except for the construction of main bearing assembly 240'. Lower portion 242' of main bearing assembly 240' does not include any supporting arms 254 as incorporated in portion 242 of main bearing assembly 240 but rather arms 254' are integrally formed with upper portion 244'. The outer peripheral edge of portion 242' is located adjacent upstanding annular projection 248' and a plurality of circumferentially spaced fasteners 296 are provided which operate to secure lower portion 242' to upper portion 244'. As in main bearing assembly 240, abutting surfaces 250', 266' and 252', 268' will serve to aid in radially and axially positioning lower portion 242' with respect to upper portion 244'. In all other respects bearing assembly 240' is substantially the same in construction and operation as main bearing assembly 240 described above.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A scroll-type machine comprising:
 a first scroll member including a first end plate having a first sealing surface thereon and a first spiral wrap disposed on said first sealing surface;

a second scroll member including a second end plate having a second sealing surface thereon and a second spiral wrap disposed on said second sealing surface;

a stationary body having means supporting said second scroll member for orbital movement with respect to said first scroll member, said second scroll member being positioned with respect to said first scroll member such that said first and second spiral wraps intermesh with one another so that orbiting of said second scroll member with respect to said first scroll member will cause said wraps to define moving fluid chambers, the edge of said first wrap spaced from said first end plate being in sealing engagement with said second sealing surface, the edge of said second wrap spaced from said second end plate being in sealing engagement with said first sealing surface; and said stationary body including axially compliant mounting means for positioning said first scroll member with respect to said second scroll member, said axially compliant mounting means being operative to resist radial and restrict circumferential movement while permitting axial movement of said first scroll member with respect to said stationary body and stop means associated with said stationary body for limiting said axial movement to a predetermined amount.

2. A scroll-type machine as claimed in claim 1, wherein said predetermined amount of axial movement is small enough to permit said machine to operate as a compressor on start-up when at a maximum axial displacement condition.

3. A scroll-type machine as claimed in claim 1, wherein said mounting means comprises slidably engaging abutment surfaces on said stationary body and said first scroll member.

4. A scroll-type machine as claimed in claim 3, wherein one of said abutment surfaces is a cylindrical member and the other of said abutment surfaces is a bore slidably receiving said cylindrical member.

5. A scroll-type machine as claimed in claim 3 wherein said scroll-type machine includes an outer shell, said stationary body being supported within said outer shell and said mounting means includes an annular ring integrally formed on said stationary body, said bore being formed in said annular ring and said cylindrical member comprises an annular flange portion formed on said first scroll member.

6. A scroll-type machine as claimed in claim 5 wherein said stop means comprise axially opposed abutment surfaces secured to said annular ring in overlying relationship to a portion of said first scroll member.

7. A scroll-type machine as claimed in claim 5 further comprising means for preventing relative rotation between said stationary body and said first scroll member.

8. A scroll-type machine as claimed in claim 7 wherein said rotation preventing means comprise a member having a first portion secured to said annular ring and a second portion secured to said first scroll member.

9. A scroll-type machine as claimed in claim 1 wherein said scroll-type machine further includes a drive shaft operatively connected to said second scroll member and motor means for rotatably driving said drive shaft to thereby cause said second scroll member to orbit relative to said first scroll member, and said stationary body includes bearing means for rotatably supporting said drive shaft.

10. A scroll-type machine as claimed in claim 9 wherein said stationary body comprises a first member for rotatably supporting said drive shaft and a second member supporting said second scroll member, said second member also including integrally formed means for radially positioning said first scroll member, said first and second members being secured together in a predetermined relative position to thereby position said first and second scroll members with respect to each other.

11. A scroll-type machine as claimed in claim 10 wherein said first and second members define a cavity therebetween positioned in surrounding relationship to said drive shaft, said cavity being adapted to accommodate a counterweight fixed to said drive shaft.

12. A scroll-type machine comprising:

an outer shell;

a first scroll member including a first end plate having a first sealing surface thereon and a first spiral wrap disposed on said first sealing surface;

a second scroll member including a second end plate having a second sealing surface thereon and a second spiral wrap disposed on said second sealing surface;

a stationary body .Supported within said outer shell and having means supporting said second scroll member for orbital movement with respect to said first scroll member, said second scroll member being positioned with respect to said first scroll member such that said first and second spiral wraps intermesh with one another so that orbiting of said second scroll member with respect to said first scroll member will cause said wraps to define moving fluid chambers, the edge of said first wrap spaced from said first end plate being in sealing engagement with said second sealing surface, the edge of said second wrap spaced from said second end plate being in sealing engagement with said first sealing surface; and an annular ring integrally formed on said stationary body, said annular ring being operative to radially position said first scroll member with respect to said stationary body and cooperating therewith to permit a limited axial movement of said first scroll member with respect to said stationary body.

13. A scroll-type machine as claimed in claim 12 further comprising stop means secured to said stationary body, said stop means being operative to positively limit said axial movement of said first scroll member in a direction away from said second scroll member.

14. A scroll-type machine as claimed in claim 13 further comprising means for preventing relative rotation between and said first scroll member and said annular ring.

15. A scroll-type machine as claimed in claim 14 wherein said rotation preventing means comprises an elongated member having opposite ends secured to said annular ring and a center portion secured to said scroll member, said elongated member being operative to resist circumferential movement of said first scroll member while permitting axial movement between said annular ring and said first scroll member.

16. A scroll-type machine as claimed in claim 15 wherein said center portion has a planar surface positioned generally perpendicular to planar surfaces of said ends.

17. A scroll-type machine comprising:
- a first scroll member including a first end plate having a first spiral wrap thereon;
- a second scroll member including a second end plate having a second spiral wrap thereon;
- a drive shaft coupled to said second scroll member;
- a stationary body having means supporting said second scroll member for orbital movement with respect to said first scroll member, said second scroll member being positioned with respect to said first scroll member such that said first and second spiral wraps intermesh with one another so that orbiting of said second scroll member with respect to said first scroll member will cause said wraps to define moving fluid chambers, said stationary body including a first member having bearing means for rotatably supporting said drive shaft and a second member radially positioning said first scroll member and supporting said second scroll member, fasteners securing said first and second members together in a predetermined relative position to thereby position said first and second scroll members with respect to each other, said fasteners being positioned radially outwardly of said first and second scroll members;
- cooperating means integrally formed on said first and second members of said stationary body for radially positioning said second member relative to said first member; and
- counterweight means on said drive shaft, said counterweight means being positioned between said bearing means and said second scroll member.

18. A scroll-type machine as claimed in claim 17 wherein said drive shaft includes a portion offset from the axis of rotation thereof, said portion being coupled to said second scroll member whereby rotation of said drive shaft produces orbital motion of said second scroll member, said counterweight means being positioned on said drive shaft at the junction between said drive shaft and said portion.

19. A scroll-type machine as set forth in claim 17 further including motor means for rotatably driving said drive shaft to thereby cause said second scroll member to orbit relative to said first scroll member, said bearing means and said first and second scroll members being positioned at one end of said motor means.

20. A scroll-type machine as claimed in claim 17 wherein said first and second members define a cavity therebetween positioned in surrounding relationship to said drive shaft, said counterweight means being positioned within said cavity.

21. A scroll-type machine as set forth in claim 17 wherein said first member radially positions said first scroll member while allowing limited axial movement thereof.

22. A scroll-type machine as set forth in claim 21 wherein said first member includes a member operative to restrict circumferential movement of said first scroll member with respect thereto.

* * * * *

UNITED STATES PATENT AND TRADEMARK OFFICE
CERTIFICATE OF CORRECTION

PATENT NO. : 5,407,335
DATED : April 18, 1995
INVENTOR(S) : Jean-Luc Caillat et al It is certified that error appears in the above-indentified patent and that said Letters Patent is hereby corrected as shown below:

Column 3, line 18, "." should be — ; —.

Column 7, line 66, after " 64''' " insert — . —.

Column 9, line 38, after "flange" insert — 433 —.

Column 9, line 38, after "433" insert — or —.

Column 9, line 39, after "fastener" insert — 434 —.

Column 9, line 39, after "434" insert — or —.

Column 11, line 3, "he" should be — the —.

Column 14, line 27, ".Supported" should be — supported —.

Column 14, line 55, "and" (first occurrence) should be deleted.

Signed and Sealed this

Third Day of October, 1995

*Attest:*

BRUCE LEHMAN

*Attesting Officer*   *Commissioner of Patents and Trademarks*